United States Patent [19]

Normark

[11] 4,230,349
[45] Oct. 28, 1980

[54] JOINT

[76] Inventor: Olov M. Normark, Astrakangtan 2, Vällingby, Sweden, S-162 32

[21] Appl. No.: 955,763

[22] Filed: Oct. 30, 1978

Related U.S. Application Data

[63] Continuation of Ser. No. 754,413, Dec. 27, 1976, abandoned.

[30] Foreign Application Priority Data

Dec. 30, 1975 [SE] Sweden .................................. 7514798

[51] Int. Cl.³ ............................................. F16L 19/08
[52] U.S. Cl. .................................. 285/342; 285/382.7
[58] Field of Search ..................... 285/382.7, 342, 343, 285/341, 340

[56] References Cited

U.S. PATENT DOCUMENTS

| | | | |
|---|---|---|---|
| 2,394,351 | 2/1946 | Wurzburger | 285/382.7 X |
| 2,791,452 | 5/1957 | Watson | 285/342 |
| 2,826,438 | 3/1958 | Woodling | 285/382.7 X |
| 3,985,379 | 10/1976 | Normark | 285/340 |

FOREIGN PATENT DOCUMENTS

| | | | |
|---|---|---|---|
| 574675 | 4/1959 | Canada | 285/341 |
| 1233372 | 5/1971 | United Kingdom | 285/382.7 |

Primary Examiner—Thomas F. Callaghan
Attorney, Agent, or Firm—Eric Y. Munson

[57] ABSTRACT

A coupling forming a connection between two elements or fittings, at least one of which has a cylindrical, or multifaced, outer surface, including in longitudinal section, a flexible beam member and a nose portion which, under application of a force in direction towards the nose portion and the beam member, makes contact with an element inserted into the coupling. The beam member and the nose portion can either be formed in one piece or in two separate but interlocked parts, generally completely surrounded by the element to be connected to the element inserted into the coupling.

8 Claims, 11 Drawing Figures

JOINT

This application is a continuation of application Ser. No. 754,413 filed Dec. 27, 1976 and now abandoned.

BACKGROUND OF THE INVENTION

The present invention relates to a coupling designed to form a connection between elements and or details preferably of mechanical nature, at least one element or fitting having a principally cylindrical, or multifaced, outer surface.

In order to achieve a coupling of the above mentioned type, a number of various designs have previously been used. As examples of previously known connection members, intended to be used in connection with elements or pipe fittings having a cylindrical outer surface, can be mentioned couplings, including a cutting ring, which, in cooperation with a body member and a nut member, is brought to glide in a wedging manner along an embraced tubular element, thus forming a surrounding collar projecting upwardly from the outer peripheral portion of the tubular element. A securing and sealing joint is thus created, but plastic and mechanical deformation of the embraced tubular member is unavoidable. A further example of previously known joints for tubular elements are tube joints of DIN-type. These include a sealing ring with mainly conical cross-section soldered against the tubular element and arranged to compress a drawn copper washer against a seat when engaged by a screw member. The seat is arranged with a conical contact surface, against which the copper washer is deformed when the screw member is actuated. When a tightened joint is loosened, the sealing washer must be replaced by a new and non-deformed washer, before the joint can be retightened. As examples of previously known techniques can also be mentioned various types of soldering and welding joints. As a further example of a previously known coupling may be mentioned the type including a tubular connector having an external screw thread and being welded to a tubular member, which external screw thread is attachable to a flange member arranged with a corresponding internal screw thread. The flange member is in turn attached to a mechanical element by means of a bolt connection with an O-ring used as a sealing element between the flange member and a planar surface formed at the aforementioned mechanical element of fitting. The examples referred to above as prior art are mainly used for connection of tubular elements having a mainly cylindrical outer surface, but similar connector members are also used for connecting bars or axles having a generally cylindrical outer surface.

For connecting elements having a multifaced outer surface, it is previously known to use tubular elements preferably having a through recess, which in cross-section has a shape corresponding to the connected fitting. In order to achieve a locking effect between the tubular element and the embraced member, a screw means has often been utilized to press the embraced member against at least one inner surface of the tubular element. The tubular element has also often been arranged with a number of grooves and an outer surface adapted to interact with a preferably conical surface, e.g., arranged inside a nut member. A springy tubular member is thus achieved, which gradually reduces the area of the through recess when the nut member is rotated and thereby moved axially in relation to the tubular element, whereby an embraced element is locked by the tubular member under spring action.

A considerable disadvantage in respect of previously known types of joints is that they are not suitable for achieving a joint between e.g. a machinery part and a bar or tube-shaped element while maintaining a low height in a direction extending from the machinery part. A further disadvantage with previously known types of couplings is that they cannot be connected with maximum securing and sealing properties without risk of mechanical deformation of or damage to the connected fitting. A further important disadvantage is that, heretofore, it has been impossible to ascertain the force of securement caused by the joint, a feature most desirable in order to optimize the properties of the connected part in relation to tensile forces, internal pressure forces, etc. Furthermore, previously known joining members based on methods of attachment such as welding, mechanical deformation or other stress-creating methods, are eminently unsuitable when the joint is subjected to vibration forces, in which case rupture often has been the result.

SUMMARY OF THE INVENTION

The object of the joint according to the present invention is to eliminate the disadvantages set forth above, as well as to attain further advantages. The coupling according to the present invention is arranged to cooperate with a machine element or other means and together form a means of connection allowing repeated connection and disconnection of an element or a fitting, without any changes in the securing properties and without changing or deforming the connected part or element in any way. Furthermore, maximum securement force can be achieved for various connector applications, since the joint with its integral parts can easily be adapted to the connected element or fitting with regard to its tensile strength or deformation properties, a feature of vital importance when used for connecting tubular elements intended for a gas or fluid flow under high pressure. The force exerted against the connected tubular member can thus be related to the wall thickness, the material and the internal pressure applied thereto, whereby the desired maximum connecting force can be obtained without any deformation of the connected element. A further advantage is that the coupling according to the present invention also provides for extremely good sealing properties between the connected element and the element or means in which the coupling is arranged, and that these sealing properties are maintained even after repeated connections and disconnections of the connected element, and that the joint is extremely resistant to vibration forces. The joint according to the present invention makes it possible also to achieve these desired features with an extremely small manual application to the joint, e.g., by an extremely limited movement of a force applying means arranged to actuate the integral elements of the joint. A resultant advantage is that the connecting and disconnecting operation is simplified, since a tool member cooperating with a force applying means needs only to be moved a limited distance, which makes it possible to utilize the joint in areas which allow only restricted movement of the tool, e.g., in a rotary movement, and also a reduced connecting and disconnecting time. The coupling according to the present invention presents further advantages, disclosed in the following specification and claims.

The coupling according to the present invention is generally characterized by beam-like contact means or shim means and a nose portion including at least two convex contact surfaces, said beam member being arranged to be pressed against an element to be connected when a force is applied to the beam member in direction towards the nose portion, thereby forcing the shim means to make full contact along the facing surface of the element to be connected, while the nose portion, in cooperation with an inclined contact or camming surface at or adjacent to a second element, acts as a resilient sealing member between the two elements.

A further characteristic feature is that at least one concave recess is arranged adjacent to the nose portion in the contact surface of the shim means and facing the outer surface of the element or fitting to be connected by the coupling, and that the joint is substantially in its entirety surrounded by the element or part to which the fitting is to be connected by means of the coupling.

BRIEF DESCRIPTION OF THE DRAWINGS

A number of embodiments of joints according to the present invention are more fully described below with reference to the accompanying drawings in which a number of embodiments within the scope of the present invention are shown.

DESCRIPTION OF PREFERRED EMBODIMENT

With reference to the shown embodiments, it should be emphasized that they are not only suitable for interconnection of tubular elements, but can also be used for interconnecting solid elements.

Figure 1:
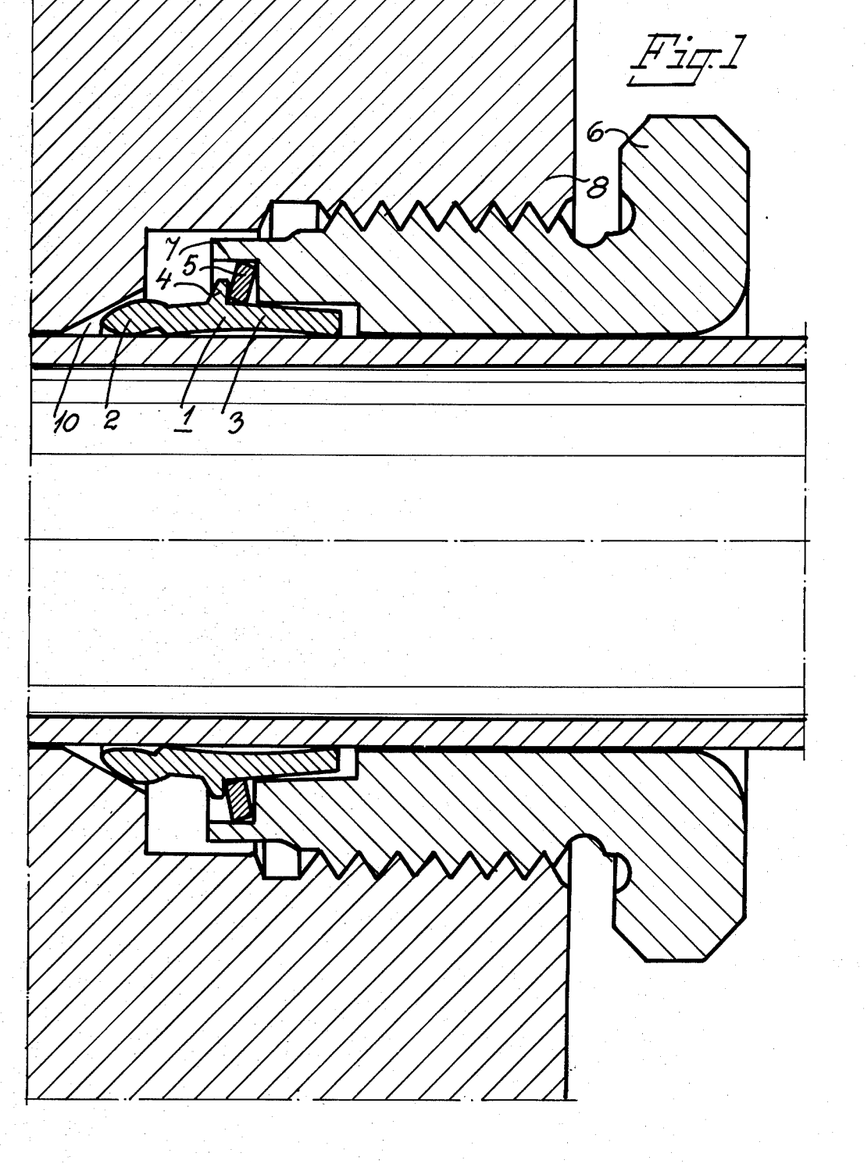
FIG. 1 is a longitudinally-extending cross-section of a first embodiment of a coupling according to the present invention, showing it applied to a tubular element in a loose position.
Figure 2:
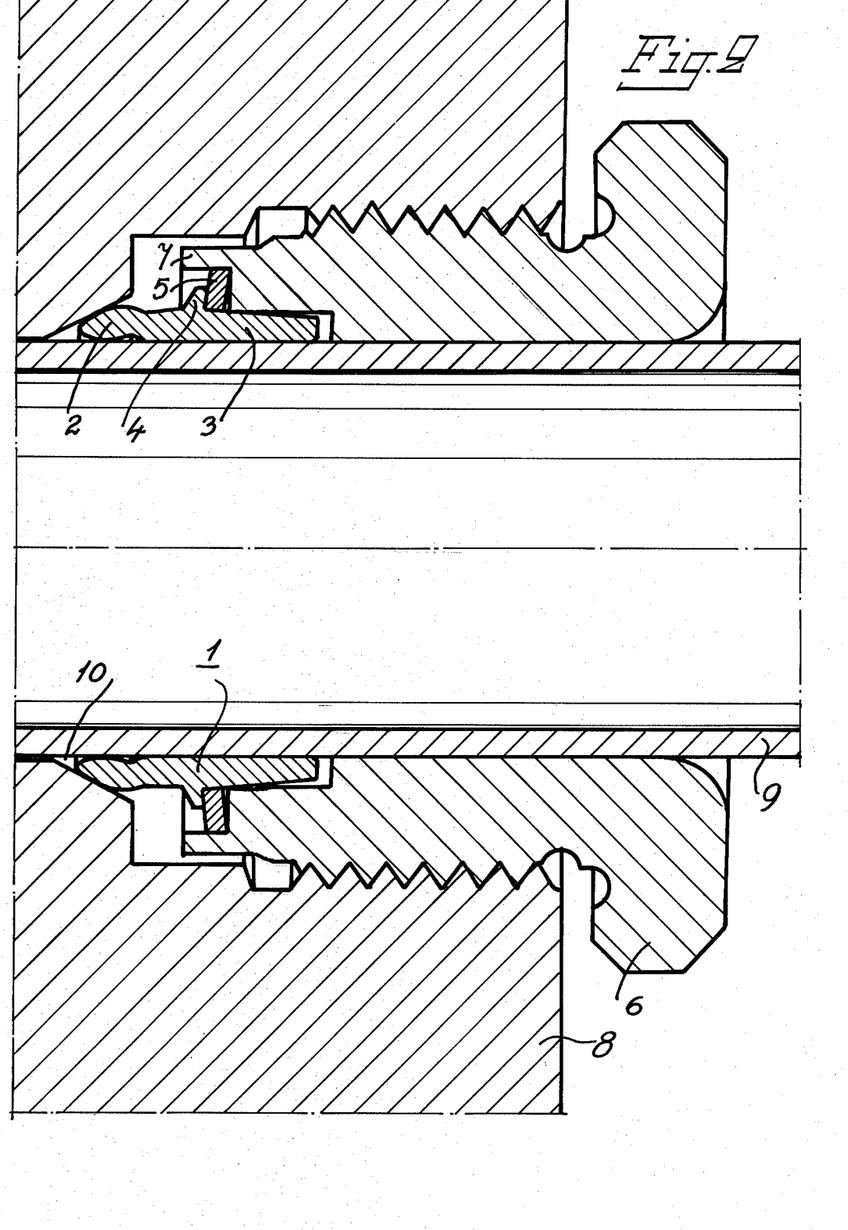
FIG. 2 is a cross-sectional view corresponding to FIG. 1, showing the coupling tightened about the tubular element.

The embodiment disclosed in FIGS. 1 and 2 includes shim means, generally denominated 1. Said shim means 1, hereinafter referred to as a beam element in view of certain characteristic features, includes a nose portion 2 having certain spring-like properties and a longitudinal beam member 3, which has an outwardly-directed contact member 4. Said contact member 4 is in the shown embodiment arranged to interact with a tensioning ring 5 having a frusto-conical cross-section and surround the beam member 3. An externally screw-threaded tubular nut member 6 is provided with a tubular tip portion 7 projecting from the forward end of the nut, which end portion is adapted to transfer axial movement of the tubular nut member 6 when rotated to the tensioning ring 5, whereby the tensioning ring 5 is raised, thus creating a radially inwardly directed force against the beam member 3. In the embodiment disclosed in FIGS. 1 and 2 are also shown a body or element 8 in which the coupling is arranged, and a tubular member 9, intended to be connected to the body or the element 8 by means of the coupling.

Said body or element 8, in which the coupling is arranged, is also provided with an internal conical surface or camming surface 10, intended to cooperate with the nose portion 2, and with a screw-threaded portion for engaging the nut member 6.

Figures 5, 10:
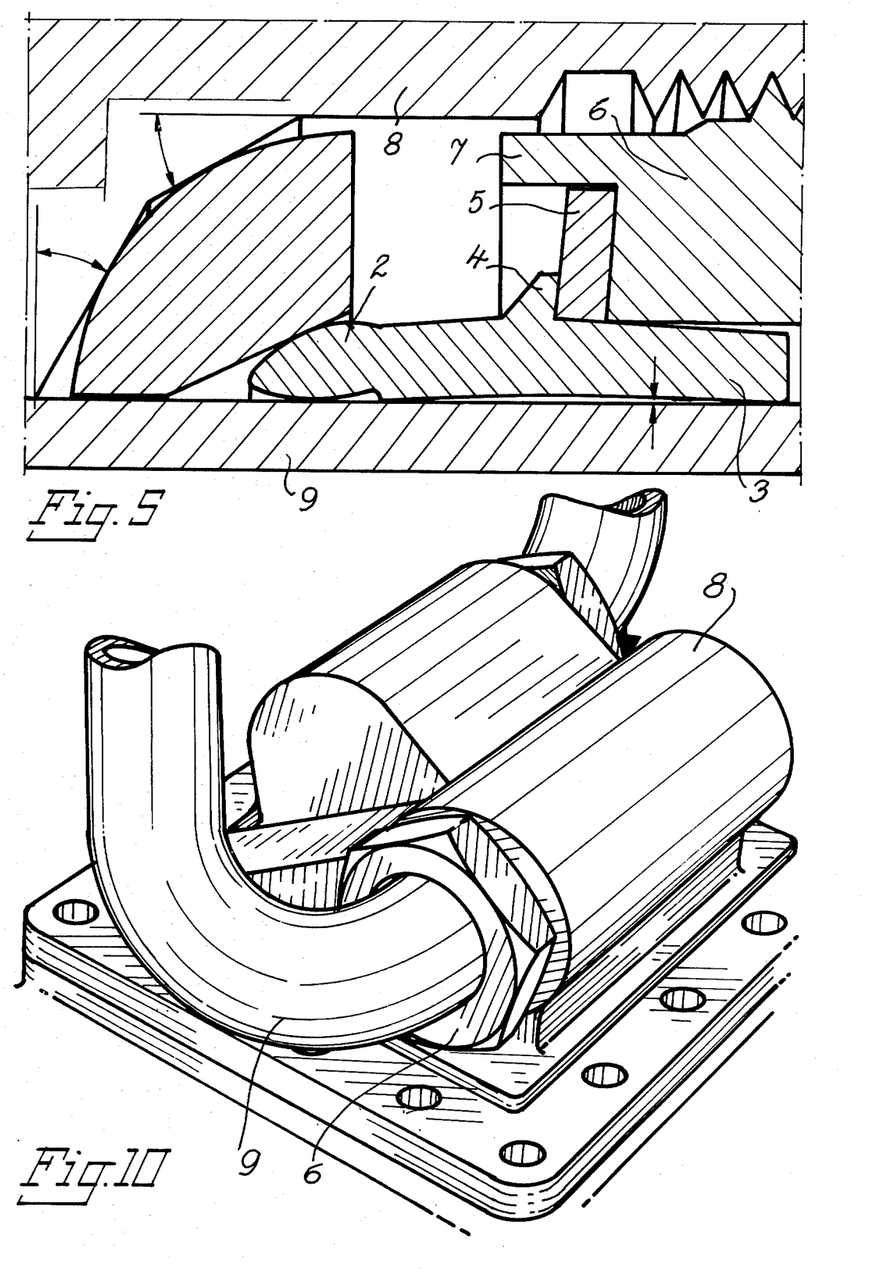
FIG. 5 is a cross-sectional view drawn to an enlarged scale of a part of a coupling according to the present invention.
FIG. 10 is a perspective view of a practical application of a coupling according to the present invention.

The inner surface of the beam member 3 is shown slightly curved or bowed, in order to establish contact first at the outer end portions of said member 3, when the tensioning ring 5 is raised or tilted. Thus, there is a difference in height between the central portion of said surface and the outer edge portions, as indicated in FIG. 5, and which is hereinafter denominated bow height.

The nose portion 2 is bounded by three radii, a forward nose radius and an upper and a lower radius. When the tensioning ring is raised or tilted, due to the axial movement of the nut member 6 in relation to the element or body 8 surrounding the joint, the beam member 3 makes contact with the embraced element or pipe 9, whereby said pipe, together with the coupling, is slightly moved axially in direction towards the surrounding element of body 8. The nose portion 2 is thus moved into contact with the conical surface 10 with its forward radius, and the nose portion 2 with its upper and lower radii becomes a sealing element, having contact with the conical surface 10 and the outside surface of the embraced fitting respectively. The beam member 3 is pressed by means of the tensioning ring into a contact position with the outer surface of the embraced element 9, whereby a friction joint is achieved.

The beam member 3 has a longitudinal varying cross-section, preferably with the central portion having a larger cross-section than the edge portions. The cross-section of the beam member, as well as the bow height, can be calculated using similar calculation formulas as used for determining the deflection of a beam supported at two spaced points when applying a predetermined load to a predetermined point between the support points. The force applied to the beam member 3 is determined by a suitable choice of tensioning ring 5 and by adjusting the tilting angle of the tensioning ring 5. By utilizing this method, it is possible to achieve a complete contact along the entire inner surface of the beam member against an embraced fitting 9, and the contact pressure can also be determined and related to the pliable deformation properties of said fitting 9.

Figure 3:
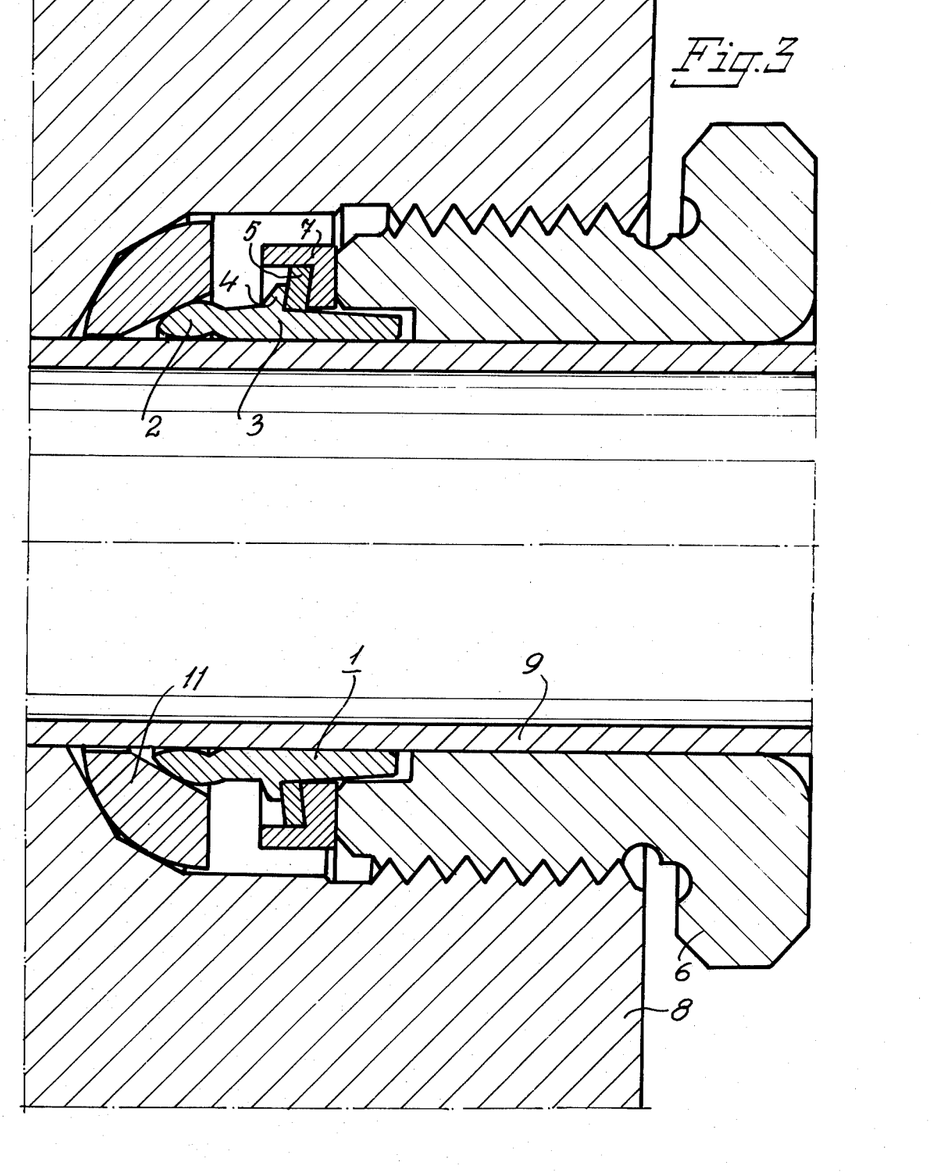
FIG. 3 is a longitudinally-extending cross-section of a second embodiment of a coupling according to the present invention, showing it in an applied and tightened position and preferably used for interconnecting elements composed of a material having low resistance against plastic deformation.

In the embodiment shown in FIGS. 1 and 2, it is regarded as a condition, that the body or the element 8, in which the coupling is arranged, is manufactured from a material having such tensile properties that the nose portion 2 can make contact with a conical contact surface 10 arranged in the said body or element 8. In view of the fact that a number of materials easily are deformed at the contact point for the nose portion 2, a modified embodiment is shown in FIG. 3. According to said embodiment, an additional insert 11 is used, having an internal conical contact surface adapted to interact with the nose portion 2 corresponding to the way described with reference to the conical surface 10. The body or element 8, in which the coupling is arranged, has in this case been provided with two conical contact surfaces, having different angular relationship, against which surfaces the additional insert 11 makes contact with an outwardly convex surface. As a result, the contact pressure is applied to two separated points and the sealing properties between the additional insert 11 and the body or element 8 surrounding the joint is also improved.

Figure 4:
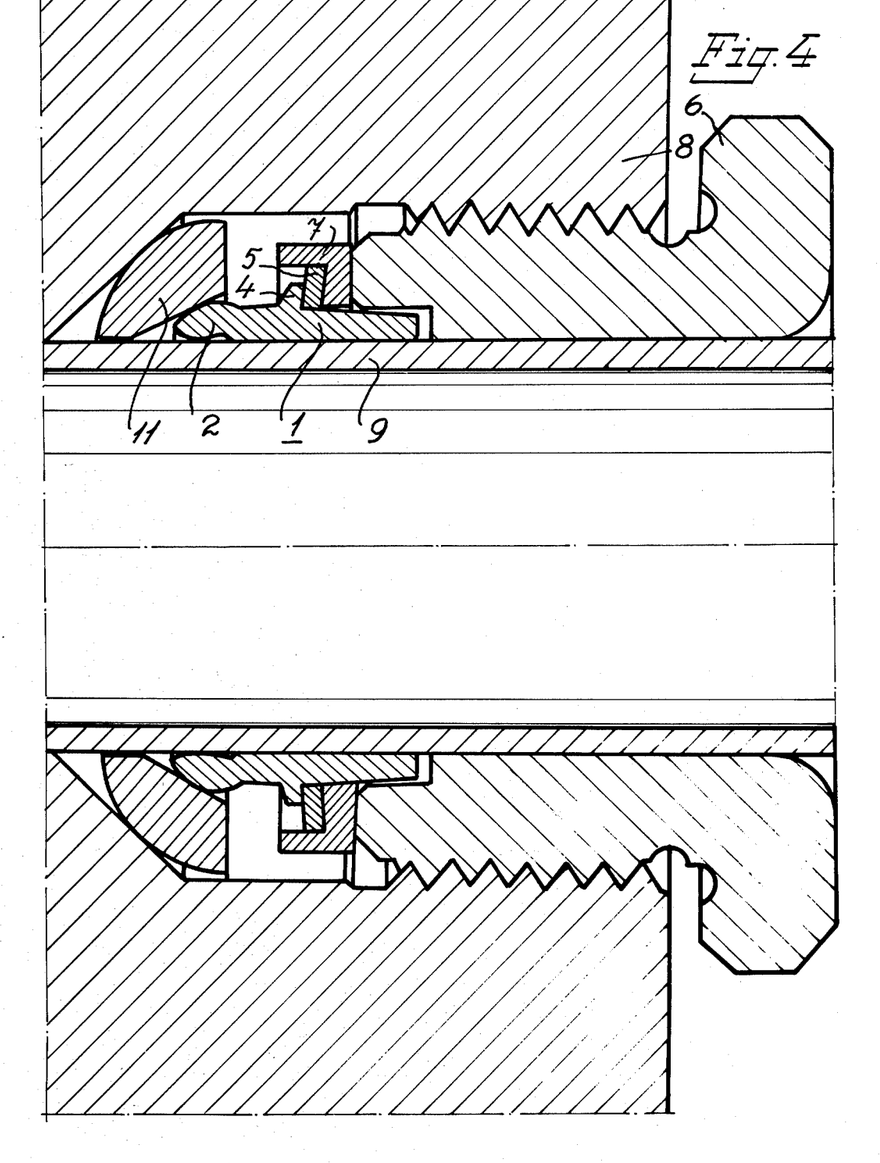
FIG. 4 is a cross-sectional view corresponding to FIG. 3, in which the body used for housing the joint is arranged in a slightly modified way.

A variation of the embodiment shown in FIG. 3 is also shown in FIG. 4. According to FIG. 4, only one conical contact surface is provided in the body or the element 8 surrounding the joint. Said embodiment is an example of a preferred embodiment when the body or the element 8 is manufactured from a hard or semihard material.

Figure 6:
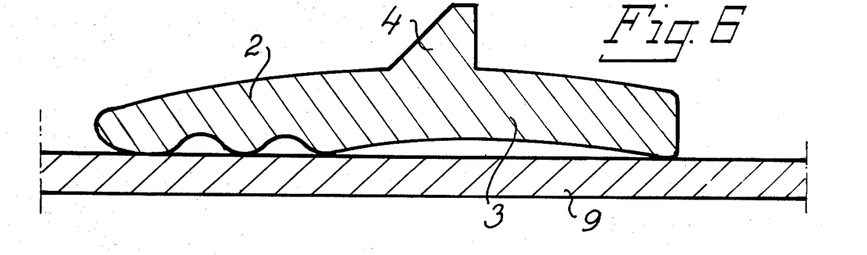
FIG. 6 is a cross-sectional view of a modified embodiment of a contact means being an integral part of the joint.

In order to obtain an improved sealing effect between the shim means 1 and the connected element 9, the shim means 1 can advantageously be arranged as shown in FIG. 6. According to this embodiment, the shim means 1 is arranged with two recesses spaced from one another adjacent to the nose portion 2 in the surface facing the connected element or fitting 9. Hereby is an improved sealing effect achieved between the shim means 1 and the connected element or part 9.

Figure 7:
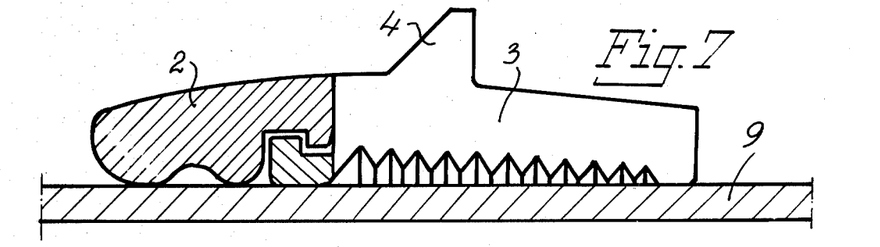
FIG. 7 is a cross-sectional view corresponding to FIG. 6 of a further modified contact means.
Figure 8:
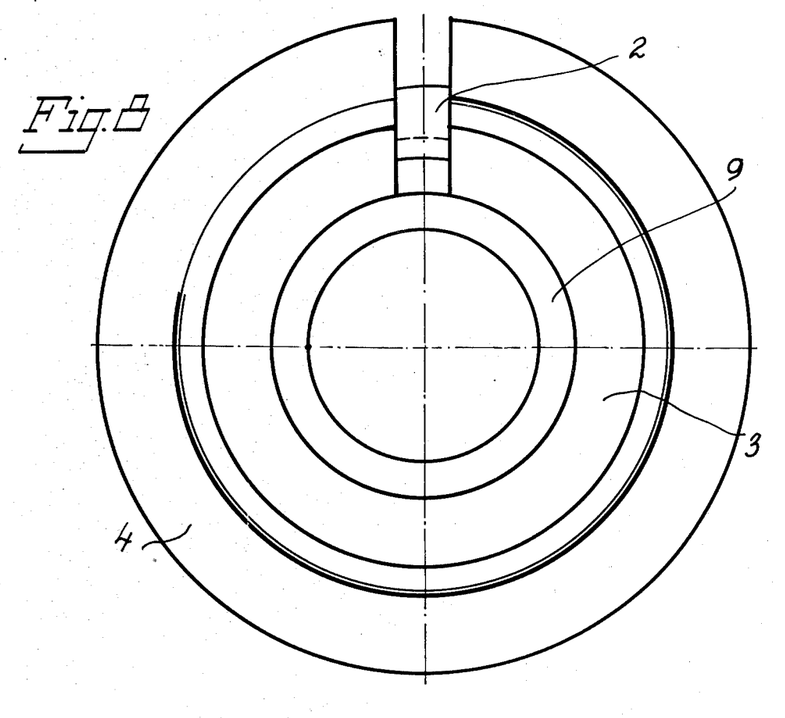
FIG. 8 is an end view of the contact means shown in FIG. 7.

A further modified embodiment of a contact means 1 is shown in FIGS. 7 and 8. According to this embodiment, the nose portion 2 and the beam member 3 are arranged as two separate elements, and the beam member 3 is provided with an axially extending groove. Thereby, the two elements 2, 3 can be joined together by contracting beam member 3 to a reduced diameter under application of force, whereby the nose portion 2 can be connected to same, e.g., by finger means on the beam member engaging a recess in the nose portion 2, as shown in FIG. 7. The inner surface of the beam member 3 has also been provided with annular grooves, which improve the contact and sealing engagement with the connected fitting 9. The arrangement of the nose portion 2 and the beam member 3 as two separate elements and providing them with interconnectable parts is advantageous in a number of ways, mainly from manufacturing point of view. This method also reduces the stock or part components, since nose portions 2 and beam members 3 with different properties can be combined in order to achieve certain predetermined and desired connecting data.

Figure 9:
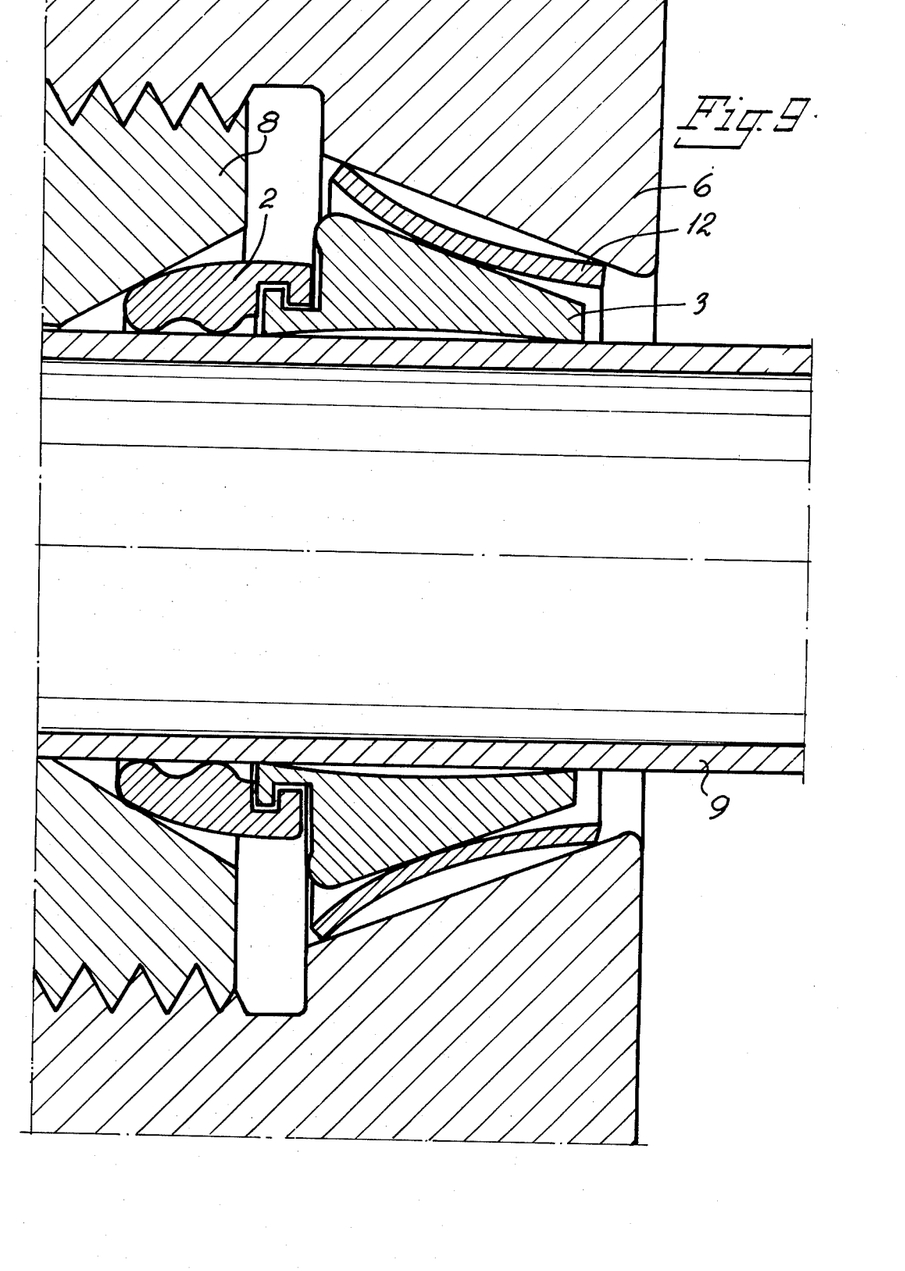
FIG. 9 is a cross-sectional view of a further embodiment of a coupling according to the present invention.

The above-described embodiments have always utilized a tensioning ring 5 of frusto-conical shape as a force transferring element. However, many other solutions can be used for application of necessary force, e.g., as shown in FIG. 9.

According to this embodiment, the nose portion 2 and the beam member 3 are separated from each other, as previously disclosed with reference to FIGS. 7 and 8. However, the beam member 3 is provided with an inclined outer surface, against which a springy member 12, co-acting with an inner inclined surface of the pressure applying member 6 flexes, whereby an axial movement of the last-mentioned surface causes the springy member 12 to exert a compressing force on the beam member 3. This embodiment is only intended to serve as an example of an embodiment within the scope of the present invention, since it is easily understood that many other modifications are possible for application of a force of desired type, all within the scope of any person skilled in the art.

FIG. 10 is intended to show the advantages achieved when using a coupling according to the present invention in a narrow space. When using conventional couplings or connection means for connecting e.g. hydraulic pipes to machine part, a certain distance is always necessary from the machine part to a point where e.g. the pipe can be bent. This distance is considerably reduced when utilizing the joint according to the present invention, which in principal can be arranged below the outer surface of the machine part.

Figure 11:
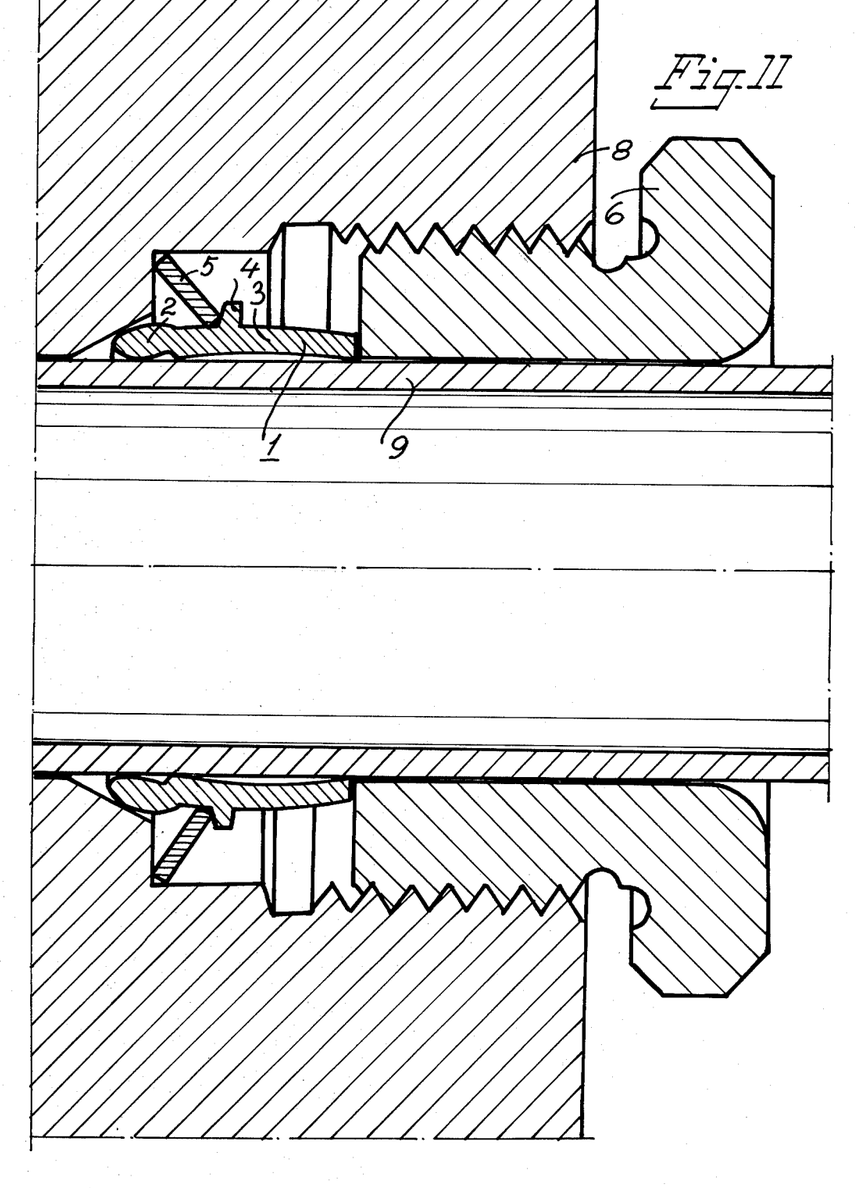
FIG. 11 is a cross-sectional view of a further modified embodiment of a coupling within the scope of the present invention.

Finally, in FIG. 11 is an embodiment disclosed of a coupling according to the present invention, intended to illustrate a further example of arranging a tensioning member 5 for application of a force necessary for connecting a fitting or an element. According to this embodiment, the tensioning member 5, e.g. a tensioning ring, is arranged with the outer peripheral portion in contact with the surrounding element or member 8, having the inside peripheral portion in contact with the contact member 1 at a point located in front of an outwardly-directed stop member 4. A force-applying means 6 is arranged with the forward edge portion in contact with the rear edge portion of the contact member 1, whereby an axially directed movement of the force-applying means 6 causes a corresponding movement of the contact member 1, whereby also the tensioning member 5 is caused to exert a radially-directed force on the contact member 1. The remaining functions of this embodiment correspond to previously discussed embodiments.

The embodiments described and shown can without any difficulties be modified for attachment of fittings or elements having a multifaced outer surface. In this case, the contact means 1 is arranged with inwardly-directed flat or slightly curved contact surfaces, arranged in such a way, that an open area is created between the contact surfaces corresponding to the cross-sectional area of the element to be attached. The contact means 1 is dimensioned and designed as set forth with respect to principles applicable for connecting elements or fittings having a generally circular outer surface. With regard to embodiments intended for connecting elements or fittings having a multifaced outer surface, the necessary connecting force can be applied in a number of ways as previously known for force application purposes, e.g. by a direct mechanical force transmission from e.g. an inclined and movable plane, by utilizing a spring means, arranged to cause necessary force application when influenced by a mechanical and movable member, or in a number of other well-known ways.

The present invention is thus in no way restricted to the embodiments shown and described, since many other embodiments are possible within the scope of the inventive thought and the following claims.

I claim:

1. A pipe coupling for interconnecting an embraced tubular member (9) and an embracing tubular member (8) telescoping one another to form a sealed interlocking joint therebetween, completely enveloped by said tubular members, comprising:

(a) flexible shim means (3) for application about said embraced member (9) and arranged to slide axially between said tubular members and having a bow-shaped smooth surface facing said embraced tubular member;

(b) a deformable substantially ovular bulging nose portion (2) connected to said shim means for engaging a camming surface connected with said embracing member and external surface of said embraced tubular member without biting into said external surface and said camming surface; and (c) a force-applying means (6) engaging at least one of said members (8, 9) axially relative thereto, effective initially to slide said nose portion into engagement with said camming surface and to flatten the bow-shaped surface of said shim means against the surface of said embraced member and thereafter upon continued application of the sliding force to deform said nose portion (2) to form a compacted sealing portion interlocking said members (8, 9).

2. A coupling according to claim 1, in which said shim means is provided with a recess facing said embraced member adjacent said nose portion.

3. A coupling according to claim 1, in which said shim means and said nose portion comprise yieldably interlocked separate parts.

4. A coupling according to claim 2, in which said shim means is provided with at least one transverse groove and in which said shim means and said nose portion are provided with flange means engaging respective recesses in said shim means and said nose portion.

5. A coupling according to claim 1, in which the force-applying means comprise tiltable tension means (5) effective to press the shim means against the embraced member by the force-applying movement.

6. A coupling according to claim 1, in which the camming surface comprises a separate insert member located in a recess in the embracing member.

7. A coupling according to claim 6, in which said insert member is provided with a curved surface tangentially bearing against a plurality of surfaces arranged at an angle to one another in said recess.

8. A coupling according to claim 1, in which said shim means comprises a cammed surface and a bowed flexible member (12) adapted to be flattened against a camming surface on the force-applying means (6) by the force-applying movement thereof.

* * * * *